United States Patent [19]

Nakayama et al.

[11] 4,130,529
[45] Dec. 19, 1978

[54] AQUEOUS FILM-FORMING COMPOSITION

[75] Inventors: Yasuharu Nakayama; Tadashi Watanabe; Reiziro Nishida, all of Hiratsuka; Satoru Enomoto, Tokyo, all of Japan

[73] Assignee: Kansai Paint Co., Ltd., Tokyo, Japan

[21] Appl. No.: 811,559

[22] Filed: Jun. 30, 1977

[30] Foreign Application Priority Data

Jul. 5, 1976 [JP] Japan .................................. 51-80273

[51] Int. Cl.$^2$ ............................................... C08L 9/00
[52] U.S. Cl. ....................... 260/29.7 UA; 260/22 CB; 260/23 EM; 260/23.7 A; 260/29.6 RW; 260/29.6 WB; 260/29.6 AB; 260/29.7 W; 568/592; 568/596
[58] Field of Search ...... 260/23 EM, 23.74, 29.6 RW, 260/29.6 WB, 29.7 UA, 29.7 W, 29.6 RB, 615 A, 22 CB

[56] References Cited

U.S. PATENT DOCUMENTS

| | | | |
|---|---|---|---|
| 3,880,793 | 4/1975 | Nakayama ...................... | 260/29.6 R |
| 3,933,706 | 1/1976 | Momiyama et al. ......... | 260/29.7 UA |
| 3,956,217 | 5/1976 | Gazeley ........................ | 260/29.6 NE |
| 3,993,612 | 11/1976 | Aihara et al. ................... | 260/23.7 A |
| 4,008,283 | 2/1977 | Enomoto et al. ................ | 260/615 A |
| 4,021,390 | 5/1977 | Enomoto et al. ............... | 260/22 CB |
| 4,033,920 | 7/1977 | Isozaki et al. .................. | 260/29.6 H |

Primary Examiner—Melvyn I. Marquis
Attorney, Agent, or Firm—Ostrolenk, Faber, Gerb & Soffen

[57] ABSTRACT

An aqueous film-forming composition is prepared by radially polymerizing unsaturated vinyl monomer with an emulsion stabilizer of oxidation curing water-soluble resin and impregnating the obtained emulsion with a compound represented by the general formula:

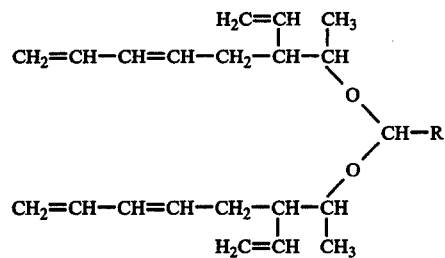

10 Claims, No Drawings

AQUEOUS FILM-FORMING COMPOSITION

BACKGROUND OF THE INVENTION

This invention relates to an aqueous film-forming composition. More particularly, the invention relates to the improvement in vinyl polymer emulsion which is prepared by radically polymerizing unsaturated vinyl monomer with emulsion stabilizers of oxidation curing polymeric water-soluble resins.

The inventors of the present application have made deep and extensive studies on the emulsions with oxidation curing polymeric water-soluble resins as emulsion stabilizers. When these emulsions are cured by oxidation, several characteristic features different from those of other common emulsions can be obtained, however, the former emulsions have the defect that the lowest temperature for film formation is not compatible with the desirable hardness of the obtained coating films when they are used as low-pollution coating materials. The present invention has been made as the result of earnest studies in order to eliminate the above drawback.

BRIEF SUMMARY OF THE INVENTION

It is, therefore, the primary object of the present invention to provide an improved aqueous film-forming composition which can be cured at a lower temperature forming a coating film of sufficient hardness.

Another object of the present invention is to provide an aqueous film-forming composition which can be applied to the surfaces of several articles without difficulty so as to form coating films with excellent properties.

A further object of the present invention is to provide an aqueous film-forming composition which can be produced easily at low cost in industrial practices.

According to the present invention, an emulsion is prepared by radically polymerizing unsaturated vinyl monomer with an emulsion stabilizer of oxidation curing polymeric water-soluble resin, and the obtained emulsion is impregnated with a compound (A) that is represented by the general formula:

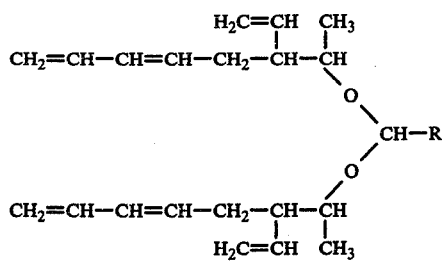

in which the symbol R is a hydrogen atom, or an alkyl group having 1 to 18 carbon atoms, phenyl group, alkyl ($C_{1-18}$) phenyl group, cyclohexyl group or alkyl ($C_{1-18}$) cyclohexyl group, thereby producing the aqueous film-forming composition of the present invention.

DETAILED DESCRIPTION OF THE INVENTION

The vinyl polymer emulsion used in the present invention has to be produced with an emulsifying agent of a polymeric water-soluble resin which can be cured by oxidation. Such an emulsion containing the emulsifying agent as a dispersion stabilizer is able to stand the shock caused by the mixing of the compound (A) because the emulsifying agent is a high polymer, and it is firmly joined to the surfaces of emulsion particles and the molecular weight is further increased by the grafting reaction which occurs during the emulsion polymerization. Furthermore, in the curing of the coating material, since the oxidation curing polymeric resin is contained, the curing of compound (A) is promoted by the gel effect and the network of gel is easily spread throughout so that a tough coating film can be formed.

The oxidation curing polymeric water-soluble resin used as an emulsion stabilizer in the present invention is preferably large in oiliness of the structure of the portion that is in contact with water because the emulsion itself is easily and stably formed, and in addition, it facilitates the impregnation of the compound (A) having large oiliness. Exemplified as such resins are the conventionally known maleinized polydiene, maleinized alkyd resin, maleinized fatty acid-modified epoxy resin, maleinized oil, maleinized stand oil, maleinized boiled-oil, maleinized fatty acid-modified acrylic resin, and fatty acid-modified acrylic resin. Further, as applicable water-soluble resins, there are water-soluble alkyd resin and oil-modified water-soluble epoxy resin.

The number average molecular weights of these water-soluble resins may be within the range of 500 to 50,000, preferably 800 to 15,000, and the acid values are in the range of 20 to 350, preferably 30 to 200.

These resins are preferably neutralized with volatile amines or ammonia, and if necessary, they are made water-soluble with the addition of water-soluble organic solvents.

The emulsion of vinyl polymer can be obtained by radically polymerizing unsaturated vinyl monomer in the above-described aqueous solution. The preferable unsaturated vinyl monomer to be used is not so strong in the hydrophilic property and it produces radicals of relatively small activity having the Q-value of not less than 0.1 in the Q-e scheme. When the hydrophilic property is too strong, the impregnation of the compound (A) becomes hard as well as the synthesis of emulsion becomes difficult. Further, when the radical activity is too strong, the reaction with the oxidizing reactive groups of the water-soluble resin is caused to occur so that the activity of the surface cured by oxidation is lost at the same time the polymerization is inhibited. Exemplified as preferable monomers are styrene, α-methyl styrene, vinyltoluene, esterified products of acrylic acid or methacrylic acid with alcohols having 1 to 26 carbon atoms, condensates of glycidyl acrylate or glycidyl methacrylate with carboxylic acids having 2-26 carbon atoms, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, butadiene, isoprene and chloroprene. These unsaturated vinyl monomers can be used solely or in a mixture of two or more. The above monomers can be used together with the following monomers, however, the former monomers must be more than 50%, preferably more than 70%, relative to the total quantity of the monomers. As the combinedly usable monomers, there are exemplified by 2-hydroxypropyl methacrylate, 2-hydroxypropyl acrylate, acrylonitrile, methacrylonitrile, acrylic acid, methacrylic acid, glycidyl acrylate, glycidyl methacrylate, vinyl acetate, Veova monomer (General formual is

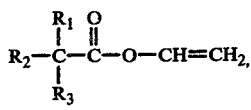

wherein $R_1$, $R_2$ and $R_3$ are saturated alkyl group: trademark, made by Shell Chemical Co.), N-n-butoxymethyl acrylamide, acrylamide, vinylpyridine, N-methylol acrylamide, and other common radically polymerizable monomers. The above monomers can be, of course, used as a mixture of two or more. In order to facilitate the impregnation of the compound (A), it is preferable that the Tg-point of the whole monomer mixture is lower than 70° C.

The quantity of water-soluble resin for stabilizing emulsion is so determined as to make the acid value of the whole solid content including unsaturated monomer 3 to 150, and preferably 10 to 50.

The compound (A) impregnated in the above emulsion has a rapid curing property that is characteristic of dienes and quite large plasticizing effect as compared with common plasticizers. Accordingly, an ideal emulsion can be prepared which is sufficiently soft when it is used for coating but becomes very hard in a short time.

The compound (A) used in the present invention can be produced by the condensation of a precursor of 1-methyl-2-vinyl-4,6-heptadiene-1-ol and aldehydes represented by the general formula: RCHO. The aldehydes to be used are, for example, aliphatic aldehydes, alicyclic aldehydes and aromatic aldehydes having 1 to 18 carbon atoms. Above all, preferable ones are aliphatic aldehydes having 8 or less carbon atoms such as formaldehyde, acetaldehyde, butyraldehyde and octyl aldehyde.

The impregnation quantity of the compound (A) relative to the solid content of emulsion is 0.1–150 PHR (parts per hundred parts of resin), and preferably 3–50 PHR.

When the compound (A) is impregnated, although it can be used by mixing as it stands, it is preferable that the compound (A) is previously emulsified or solubilized by adding water-soluble resin or common emulsifying agent so as to prevent the occurrence of troubles such as lump formation. As the above water-soluble resin, 1–600%, preferably 5–200%, of the oxidation curing water-soluble resin that is used as the stabilizer for the emulsion of the present invention, is mixed well with the compound (A).

The aqueous film-forming composition of the present invention is of quite good quality in that it forms coating films at normal temperature, however, the composition can be made a thermosetting type by adding melamine or the like. Further, the composition of the present invention can be used for preparing resin processing agents and adhesives as well as the coating materials.

In order that those skilled in the art may better understand the present invention and the manner in which it is practiced, the following specific examples and reference examples are given. In these examples, unless otherwise indicated, parts and percents are by weight.

REFERENCE EXAMPLE 1

Maleinized polybutadiene of 100 in acid value was prepared by the maleinization of 1,2-vinyl type polybutadiene having a number average molecular weight of 3,000. This was neutralized with 0.95 equivalent of ammonia to carboxylic group and, after adding 35 PHR of butyl Cellosolve, it was dissolved in water. Then, 259 PHR of n-butylmethacrylate was added to the solution and it was emulsified by stirring well. To this emulsion was added 0.25 PHR (vs. n-butyl methacrylate) of ammonium peroxide and it was heated to 80° C. and maintained for 2 hours. Thus, an emulsion of fine particles containing 40% solid content was obtained.

REFERENCE EXAMPLE 2

A polymer having a peak molecular weight of about 7,000 and an acid value of 80 was prepared by dropping and polymerizing the following monomers in a solution of butyl Cellosolve.

| Adduct of safflower oil fatty acid glycidyl methacrylate | 60 parts |
|---|---|
| Styrene | 27 parts |
| Acrylic acid | 13 parts |

Then, 0.16 part (as metal) of cobalt naphthenate, 0.16 part (as metal) of manganese naphthenate and 0.45 part (as metal) of lead naphthenate were added to the above reaction product and it was neutralized with ammonia to obtain an auxiliary water-soluble resin containing 25 PHR of butyl cellosolve.

EXAMPLES 1–3

The compound (A) in the quantities as indicated in the following Table 1 were respectively mixed with the auxiliary water-soluble resin obtained in Reference Example 2, and after controlling the viscosities with water, they were added to the respective portions of the emulsion obtained in Reference Example 1, with stirring to prepare aqueous film-forming compositions. The compounding ratio of the auxiliary water-soluble resin was 1 part of the water-soluble resin to 9 parts (as solid content) of the emulsion obtained in Reference Example 1. The properties of the prepared compositions are shown in Table 1.

COMPARATIVE EXAMPLE 1

The mixture of 9 parts of the emulsion obtained in Reference Example 1 and 1 part of the water-soluble resin obtained in Reference Example 2, was prepared. The properties of the mixture are shown in Table 1.

EXAMPLES 4–6

To each of the aqueous film-forming compositions prepared in Examples 1 to 3, 80 PHR of titanium white was added and dispersed by a quick mill. The properties of the mixtures are shown in Table 1.

COMPARATIVE EXAMPLE 2

A mixture was prepared by adding 80 PHR of titanium white to the composition obtained in Comparative Example 1, and it was dispersed well. The properties of this mixture are shown in Table 1.

Table 1

| Items \ Examples | Ex. 1[*2] | Ex. 2 | Ex. 3 | C. Ex. 1[*3] | Ex. 4 | Ex. 5 | Ex. 6 | C. Ex. 2 |
|---|---|---|---|---|---|---|---|---|
| Compounding ratio of compound (A) (PHR)[*1] | 5 | 10 | 20 | 0 | 5 | 10 | 20 | 0 |
| Solid content of composition (%) | 43 | 43 | 41 | 42 | 49 | 43 | 40 | 51 |
| Viscosity of composition (PS), (6rpm) | 20 | 19 | 21 | 17 | 40 | 31 | 18 | 40 |
| Lowest film-forming temperature (° C) | <−10 | <−10 | <−10 | −5 | <−10 | <−10 | <−10 | 1 |
| Gloss (60°) | — | — | — | — | 63 | 57 | 60 | 68 |
| Gel fraction after drying at 20° C for 1 day (%) | 20 | 31 | 67 | 10 | — | — | — | — |
| Properties of coating film after drying at 20° C for 7 days | | | | | | | | |
| Hardness | F | F | F | F | H | H | H | H |
| Erichsen test (mm) | 8 | 8 | 8 | 6 | 7 | >8 | >8 | 2 |
| Adhesiveness | 100/100 | 100/100 | 100/100 | 100/100 | 100/100 | 100/100 | 100/100 | 100/100 |
| Impact resistance (cm) | 50 | 45 | 45 | 35 | 35 | 40 | 40 | 30 |
| Gasoline resistance (min.) | 60 | 60 | 70 | 5 | 30 | 60 | 60 | 30 |
| Salt spray test | ○[*4] | ○ | ○ | △[*5] | △ | △ | △ | △ |
| Water Resistance (after 10 days) | ○ | ○ | ○ | ○ | ○ | ○ | ○ | ○ |

Notes for Table 1:
[*1] The used comound (A) was one which is represented by the foregoing general formula having CH₃ as R.
[*2] Ex. means Example.
[*3] C. Ex. means Comparative Example.
[*4] The mark ○ means fair
[*5] The mark △ means poor.

EXAMPLE 7

A mixture of RJ-101 (trademark of styrene-allyl alcohol copolymer made by Monsanto Chemical Co.)/linseed oil fatty acid =16/20, was esterified until it becomes less than 5 in acid value, and then it was subjected to maleinization to obtain a resin of 100 in acid value. A 74% solution of this resin in butyl cellosolve was prepared and it was neutralized with ammonia. Emulsion polymerization was carried out by adding 414 parts of monomer mixture (styrene/iso-butyl methacrylate = 3/7) to 160 parts (as solid content) of the above solution, and thus a fine emulsion containing 40% of solid component was obtained. To this emulsion, 8.5% (as solid content) of the water-soluble resin containing 25 PHR of butyl Cellosolve obtained in Reference Example 2 was added. Further, 15.2% of the compound (A) was added to the above mixture. When the compound (A) was not added, a film was not formed with the emulsion, however, the emulsion containing the compound (A) had the film-forming property and the lowest film-forming temperature was −1° C. After 20 hours from the film formation, the hardness was 4B and after 1 week, it became H. The gloss, hardness and water resistance were satisfactory for the use of clear coating material.

NOTES FOR TESTED ITEMS

Hardness: The coated surface was scratched by Mitsubishi UNI Pencils (trademark, made by Mitsubishi Pencil Co., Ltd., in Japan) of 6B to 9H in hardness. The value of hardness was represented by the hardest pencil with which any scratch was not made (the softer grade next to the pencil which made scratches on the coated surface).

Adhesiveness: 100 checkered squares (1 × 1 mm) were made by cutting the coating film with a knife. Then, a piece of self-adhesive tape was applied to the cut squares and quickly peeled off. When the number of remained squares was n, the test result was represented by (n/100).

Erichsen test: An Erichsen film tester was used at 20° C.

Impact resistance: Measured at 20° C. by using a weight of 500 g, 0.5 inch in diameter, and a Du Pont impact tester.

Gasoline resistance: Coating films were immersed in gasoline (made by Nippon Oil Co., Ltd.) and the times in which they were softened were measured.

Salt spray test: Measured according to JIS (Japanese Industrial Standards) Z 2371.

Water resistance: Test pieces were immersed in water at 20° C. for 10 days, and then the occurrence of change in coating film was observed.

With the above-described test results, the advantages of the present invention will be understood. Although the present invention has been described in connection with preferred examples thereof, many variations and modifications will now become apparent to those skilled in the art. It is preferred, therefore, that the present invention be limited not by the specific disclosure herein but only by the appended claims.

What is claimed is:

1. An aqueous film-forming composition which is prepared by radically polymerizing unsaturated vinyl monomer which produces radicals having a Q value of not less than 0.1 in the Q-e scheme in the presence of an amount of emulsion stabilizer of oxidation curing polymeric water-soluble resin to produce an emulsion whose acid number is 3-150, and impregnating said emulsion with 0.1 to 150 parts per hundred resin solid content of said emulsion of a compount (A) represented by the general formula:

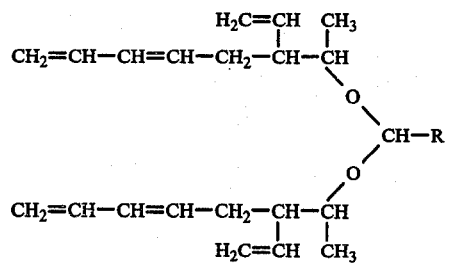

in which R is a hydrogen atom, an alkyl group having 1 to 18 carbon atoms, phenyl group, 1-18 carbon atom alkyl phenyl group, cyclohexyl group or 1-18 carbon atom alkyl cyclohexyl group.

2. An aqueous film-forming composition as claimed in claim 1, wherein said compound (A) is 1,1-bis(1'-methyl-2'-vinyl-4',6'-heptadienoxy)-alkane having R of an alkyl group having 1 to 18 carbon atoms or of a hydrogen atom.

3. An aqueous film-forming composition as claimed in claim 1, wherein the quantity of said compound (A) is 3 to 50 PHR relative to the solid content of said emulsion.

4. An aqueous film-forming composition as claimed in claim 1, wherein said unsaturated vinyl monomer is at least one member selected from the group consisting of styrene, α-methyl styrene, vinyltoluene, esters of acrylic acid and methacrylic acid with alcohols having 1 to 26 carbon atoms, condensates of glycidyl acrylate and glycidyl methacrylate with carboxylic acids having 2 to 26 carbon atoms, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, butadiene, isoprene and chloroprene.

5. An aqueous film forming composition as claimed in claim 1, wherein the amount of said compound (A) is 3-50 parts per hundred resin.

6. An aqueous film forming composition as claimed in claim 1, wherein said emulsion stabilizer has a number average molecular weight of 500-50,000 and an acid number of 20-350.

7. An aqueous film forming composition as claimed in claim 6, wherein said emulsion stabilizer has a number average molecular weight of 800-15,000 and an acid number of 30-200 and wherein the amount of said emulsion stabilizer is that sufficient to produce an emulsion having an acid number of 10-50.

8. An aqueous film forming composition as claimed in claim 1, wherein said emulsion stabilizer is maleinized polybutadiene.

9. An aqueous film forming composition as claimed in claim 1, wherein said emulsion stabilizer is maleinized styrene-allyl alcohol copolymer.

10. An aqueous film forming composition as claimed in claim 1, wherein R is methyl.

* * * * *